US007647168B2

(12) United States Patent

Kikuchi et al.

(10) Patent No.: US 7,647,168 B2
(45) Date of Patent: Jan. 12, 2010

(54) MAP DISPLAYING APPARATUS, MAP DISPLAYING METHOD, AND COMPUTER PRODUCT

(75) Inventors: Shin Kikuchi, Tokyo (JP); Keisuke Onishi, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 609 days.

(21) Appl. No.: 10/575,083

(22) PCT Filed: Oct. 1, 2004

(86) PCT No.: PCT/JP2004/014505

§ 371 (c)(1),
(2), (4) Date: Apr. 7, 2006

(87) PCT Pub. No.: WO2005/036503

PCT Pub. Date: Apr. 21, 2005

(65) Prior Publication Data

US 2007/0021911 A1 Jan. 25, 2007

(30) Foreign Application Priority Data

Oct. 9, 2003 (JP) ............................. 2003-351258

(51) Int. Cl.
*G01C 21/30* (2006.01)

(52) U.S. Cl. ....................... 701/211; 701/200; 701/207; 701/208; 340/988; 340/989; 340/990; 340/995.1

(58) Field of Classification Search ................. 701/211, 701/200, 207, 208
See application file for complete search history.

(56) References Cited

U.S. PATENT DOCUMENTS

| | | | | |
|---|---|---|---|---|
| 5,297,051 | A * | 3/1994 | Arakawa et al. | 701/200 |
| 5,559,938 | A * | 9/1996 | Van Roekel et al. | 345/441 |
| 5,974,876 | A * | 11/1999 | Hijikata et al. | 73/178 R |
| 6,356,835 | B2 * | 3/2002 | Hayashi et al. | 701/208 |
| 6,565,610 | B1 * | 5/2003 | Wang et al. | 715/210 |
| 6,643,585 | B2 * | 11/2003 | McGovern | 701/211 |
| 6,927,774 | B2 * | 8/2005 | Yano | 345/469 |
| 7,010,567 | B1 * | 3/2006 | Mori | 709/203 |
| 2003/0220735 | A1 * | 11/2003 | Nimura | 701/208 |
| 2008/0216022 | A1 * | 9/2008 | Lorch et al. | 715/847 |

FOREIGN PATENT DOCUMENTS

| | | |
|---|---|---|
| JP | 05-061927 | 3/1993 |
| JP | 7-182493 | 7/1995 |
| JP | 7-244719 | 9/1995 |

(Continued)

*Primary Examiner*—Khoi Tran
*Assistant Examiner*—Jonathan Sample
(74) *Attorney, Agent, or Firm*—Oblon, Spivak, McClelland, Maier & Neustadt, L.L.P.

(57) ABSTRACT

The map-display-area determining unit determines an area in which a map is to be displayed. The road-information obtaining unit obtains, from map data transmitted from a map-data distributing server, curved-point coordinate information and name information of a traffic route. A map-display-data generating unit determines a display position for each of a character or symbol included in a character/symbol string in the name information so that the character or symbol is positioned along the traffic route without interfering with another character or symbol, and generates map display data for displaying the character or symbol at the determined display position.

10 Claims, 13 Drawing Sheets

FOREIGN PATENT DOCUMENTS

| | | |
|---|---|---|
| JP | 07-296153 | 11/1995 |
| JP | 8-194432 | 7/1996 |
| JP | 2000-029450 | 1/2000 |
| JP | 2002-297025 | 10/2002 |
| JP | 2002-351311 | 12/2002 |

* cited by examiner

FIG.2

| ROAD IDENTIFICATION INFORMATION | COORDINATES OF CURVED POINT 1 | COORDINATES OF CURVED POINT 2 | COORDINATES OF CURVED POINT 3 | · | · | COORDINATES OF CURVED POINT N |
|---|---|---|---|---|---|---|
| ROAD 1 | x11 , y11 | x12 , y12 | x13 , y13 | · | · | x1N , y1N |
| ROAD 2 | x21 , y21 | x22 , y22 | x23 , y23 | · | · | x2N , y2N |
| · | · | · | · | · | · | · |
| ROAD i | xi1 , yi1 | xi2 , yi2 | xi3 , yi3 | · | · | xiN , yiN |
| · | · | · | · | · | · | · |
| ROAD I | xI1 , yI1 | xI2 , yI2 | xI3 , yI3 | · | · | xIN , yIN |

| ROAD IDENTIFICATION INFORMATION | ROAD NAME |
|---|---|
| ROAD 1 | YASUKUNI DORI |
| ROAD 2 | AOYAMA DORI |
| . | . |
| ROAD i | HAKUSAN DORI |
| . | . |
| ROAD I | YAMATE DORI |

| ROAD NAME |
|---|
| YASUKUNI DORI |
| AOYAMA DORI |
| · |
| HAKUSAN DORI |
| |
| |

MAP DISPLAYING APPARATUS, MAP DISPLAYING METHOD, AND COMPUTER PRODUCT

TECHNICAL FIELD

The present invention relates to a map displaying apparatus, a map displaying method, and a map displaying program.

BACKGROUND ART

Conventionally, a map displaying apparatus is publicly known that obtains curved-point coordinate information for displaying each of traffic routes individually and map data that includes name information of the traffic routes, both of which are transmitted from a map-data distributing server via a network, and displays a map based on the obtained map data. The traffic routes denote roads, railroads, and the like. There is a type of such a map displaying apparatus that, when the map data is obtained from the map-data distributing server in the form of raster data, displays map display data as the way it is, the map display data including name information of the traffic routes and having been obtained from the map-data distributing server. There is another type of such a map displaying apparatus that, when the map data is obtained from the map-data distributing server in the form of vector data, generates and displays map display data that includes name information of the traffic routes arranged so as to be positioned along the traffic routes.

For example, Non-patent Document 1 discloses a conventional technique for receiving map data in the form of raster data from a map-data distributing server and displaying map display data as the way it is, the map display data including name information of the traffic routes and having been obtained from the map-data distributing server. Further, Patent Document 1 discloses another conventional technique for generating and displaying map display data that includes name information of the traffic routes arranged so as to be positioned along the traffic routes in the map data obtained in the form of vector data. Also, Patent Document 2 discloses another conventional technique for generating, near a traffic route in map data, a rectangular display area in which name information of the traffic route is to be arranged and displaying the name information in the rectangular display area.

Non-patent Document 1: An example of displaying road names with a PC browser, [online] [Searched on October 2, $15^{th}$ Year of Heisei=2003], the Internet <http://www-.mapquest.com/main.adp>

Patent Document 1: The Japanese Unexamined Patent Application Publication No. H7-182493

Patent Document 2: The Japanese Unexamined Patent Application Publication No. H7-244719

DISCLOSURE OF INVENTION

Problem to be Solved by the Invention

According to the conventional technique disclosed in Non-patent Document 1, it is possible to display the name information of the traffic route; however, when each character or symbol representing the name information needs to be displayed after being rotated individually so as to be positioned along the curves of the traffic routes, the problem is that the amount of the map data becomes extremely large. According to the conventional technique disclosed in Patent Document 1, it is possible to arrange and display the name information so as to be positioned along the traffic route; however, when a piece of name information interferes with another piece of name information on the map, one of the pieces of name information needs to be either omitted or moved according to predetermined priority levels. Thus, the problem is that it is not possible to display all of the pieces of name information that are intended to be displayed.

According to the conventional technique disclosed in Patent document 2, it is possible to generate, near the traffic route in the map data, the rectangular display area in which the name information of the traffic route is arranged and to display the name information in the rectangular display area; however, it is not possible to display each character or symbol representing the name information so as to be positioned along the curves of the traffic route. In addition, when a piece of name information interferes with another piece of name information on the map, by referring to priority levels of the traffic routes, one of the traffic routes having a lower priority level needs to be moved to another display area. Thus, the problem is that it is not possible to display all of the pieces of name information that are intended to be displayed.

Furthermore, according to the conventional techniques disclosed in Non-patent Document 1, Patent Document 1, and Patent Document 2, there is no consideration on a possibility that, due to branching of a traffic route in the traveling direction or the processing of the obtained map data, one traffic route may be treated as two or more different traffic routes so that two or more pieces of name information are displayed in duplication for the only one traffic route. Thus, the problem is that the pieces of name information displayed in duplication obstruct other pieces of name information and make it difficult to see the display.

In view of the problems mentioned above, the present invention aims to provide a map displaying apparatus, a map displaying method, and a map displaying program that prevent interference, eliminate displays in duplication, and thus display pieces of name information of traffic routes in such a manner that they are easy to see.

MEANS FOR SOLVING PROBLEM

A map displaying apparatus according to one aspect of the present invention obtains map data including curved-point coordinate information and name information of a traffic route for displaying the traffic route individually, which is transmitted from a map-data distributing server via a network, and displays a map based on the obtained map data. The map displaying apparatus includes a display-area determining unit that determines a display area in which the map is to be displayed; an obtaining unit that obtains, from the map data transmitted from the map-data distributing server, the curved-point coordinate information and the name information of the traffic route to be displayed in the display area determined by the display-area determining unit; and a map-display-data generating unit that determines a display position of each character or each symbol included in a character/symbol string in the name information so that the character or the symbol is positioned along the traffic route without interfering with other character or symbol, and generates map display data for displaying the character or the symbol at the determined display position.

A map displaying apparatus according to another aspect of the present invention obtains map data including curved-point coordinate information and name information of a traffic route for displaying the traffic route individually, which is transmitted from a map-data distributing server via a network, and displays a map based on the obtained map data. The map displaying apparatus includes a display-area determining unit that determines a display area in which the map is to be displayed; an obtaining unit that obtains, from the map data transmitted from the map-data distributing server, the curved-point coordinate information and the name information of the traffic route to be displayed in the display area determined by the display-area determining unit; and a map-display-data generating unit that generates map display data for displaying a character/symbol string in the name information along the traffic route. Before generating the map display data for displaying the character/symbol string in the name information corresponding to the traffic route along the traffic route, the map-display-data generating unit judges whether the map display data for displaying the character/symbol string in the display area determined by the display-area determining unit is generated, and if the map display data is generated, the map-display-data generating unit does not generate the map display data for displaying the character/symbol string in the name information of the traffic route.

A map-displaying method according to still another aspect of the present invention is for obtaining map data including curved-point coordinate information and name information of a traffic route for displaying the traffic route individually, which is transmitted from a map-data distributing server via a network, and displaying a map based on the obtained map data. The map-displaying method includes determining a display area in which the map is to be displayed; obtaining, from the map data transmitted from the map-data distributing server, the curved-point coordinate information and the name information of the traffic route to be displayed in the display area determined at the determining; and generating including determining a display position of each character or each symbol included in a character/symbol string in the name information so that the character or the symbol is positioned along the traffic route without interfering with other character or symbol, and generating map display data for displaying the character or the symbol at the determined display position.

A map-displaying method according to still another aspect of the present invention is for obtaining map data including curved-point coordinate information and name information of a traffic route for displaying the traffic route individually, which is transmitted from a map-data distributing server via a network, and displaying a map based on the obtained map data. The map-displaying method includes determining a display area in which the map is to be displayed; obtaining, from the map data transmitted from the map-data distributing server, the curved-point coordinate information and the name information of the traffic route to be displayed in the display area determined at the determining; and generating map display data for displaying a character/symbol string in the name information along the traffic route. Before generating the map display data for displaying the character/symbol string in the name information corresponding to the traffic route along the traffic route, the generating includes judging whether the map display data for displaying the character/symbol string in the display area determined by the display-area determining unit is generated, and not generating the map display data for displaying the character/symbol string in the name information of the traffic route if the map display data is generated.

A map-displaying program according to still another aspect of the present invention is for obtaining map data including curved-point coordinate information and name information of a traffic route for displaying the traffic route individually, which is transmitted from a map-data distributing server via a network, and displaying a map based on the obtained map data. The map-displaying program causes a computer to execute determining a display area in which the map is to be displayed; obtaining, from the map data transmitted from the map-data distributing server, the curved-point coordinate information and the name information of the traffic route to be displayed in the display area determined at the determining; and generating including determining a display position of each character or each symbol included in a character/symbol string in the name information so that the character or the symbol is positioned along the traffic route without interfering with other character or symbol, and generating map display data for displaying the character or the symbol at the determined display position.

A map-displaying program according to still another aspect of the present invention is for obtaining map data including curved-point coordinate information and name information of a traffic route for displaying the traffic route individually, which is transmitted from a map-data distributing server via a network, and displaying a map based on the obtained map data. The map-displaying program causes a computer to execute determining a display area in which the map is to be displayed; obtaining, from the map data transmitted from the map-data distributing server, the curved-point coordinate information and the name information of the traffic route to be displayed in the display area determined at the determining; and generating map display data for displaying a character/symbol string in the name information along the traffic route. Before generating the map display data for displaying the character/symbol string in the name information corresponding to the traffic route along the traffic route, the generating includes judging whether the map display data for displaying the character/symbol string in the display area determined by the display-area determining unit is generated, and not generating the map display data for displaying the character/symbol string in the name information of the traffic route if the map display data is generated.

EFFECT OF THE INVENTION

With the map displaying apparatus, the map displaying method, and the map displaying program according to the present invention, it is possible to prevent interference, eliminate displays in duplication, and thus display pieces of name information of traffic routes in such a manner that they are easy to see.

BRIEF DESCRIPTION OF DRAWINGS

FIG. 2 is a drawing of an example of a road-identification-information table to be received, as a part of map data, by the map displaying apparatus shown in FIG. 1 from the map-data distributing server;

EXPLANATIONS OF LETTERS OR NUMERALS

Figure 1:
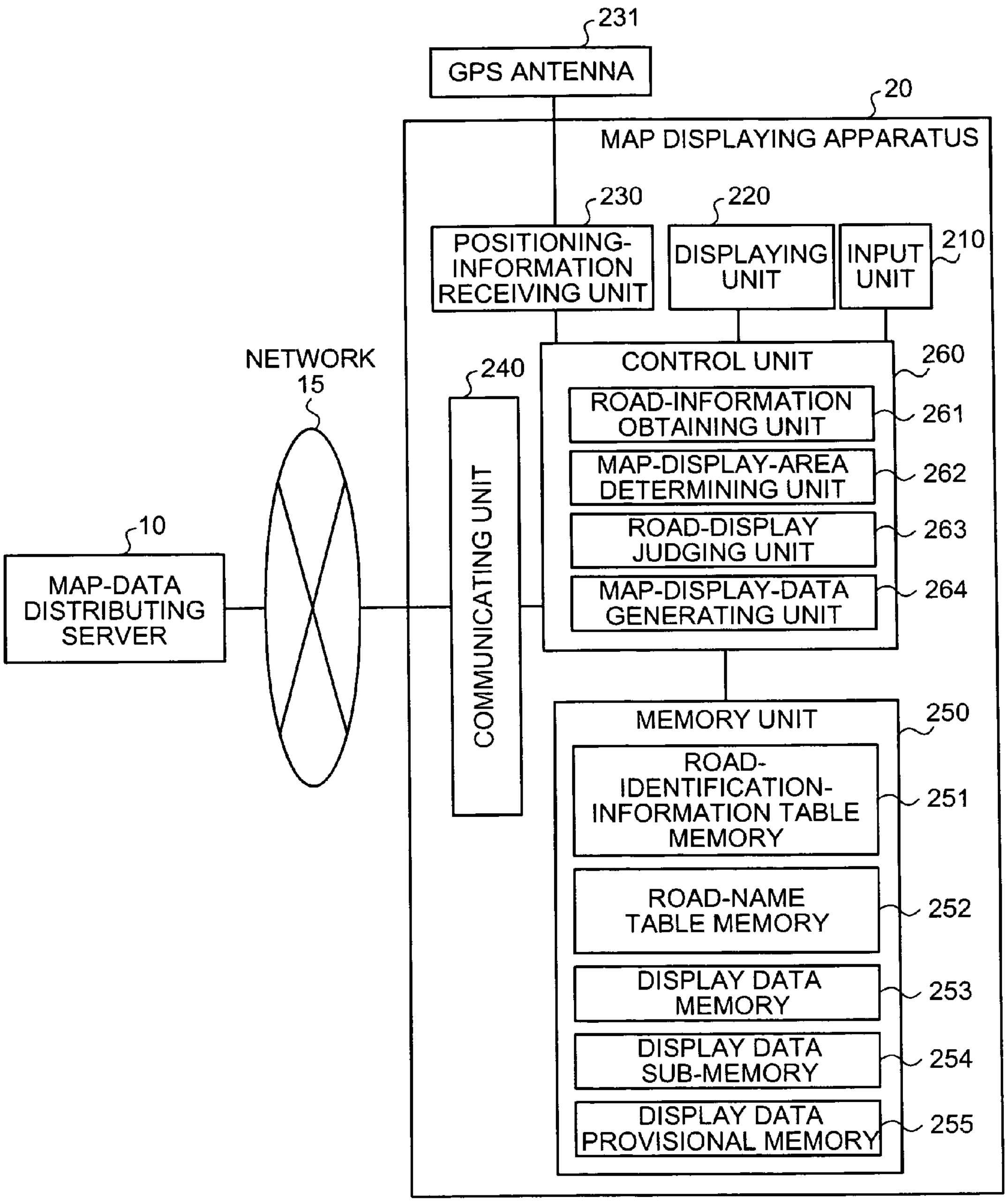
FIG. 1 is a functional block diagram of the configuration of a map displaying system according to a first embodiment of the invention.

10: map-data distributing server
15: network
20: map displaying apparatus
210: input unit
220: displaying unit
230: positioning-information receiving unit
231: GPS antenna
240: communicating unit
250: memory unit
251: road-identification-information table memory
252: road-name table memory
253: display data memory
254: display data sub-memory
255: display-data provisional memory
256: road-name-display identification table
260: control unit
261: road-information obtaining unit
262: map-display-area determining unit
263: road-display judging unit
264: map-display-data generating unit

BEST MODE(S) FOR CARRYING OUT THE INVENTION

Exemplary embodiments of a map displaying apparatus according to the present invention will be explained in detail with reference to the accompanied drawings. In the description of a first embodiment of the invention, an example will be explained in which the map displaying apparatus prevents interference among road names when displaying the road names so as to be positioned along the roads. In the description of a second embodiment of the invention, an example will be explained in which the map displaying apparatus eliminates displaying road names in duplication for a single road. At the end, various modification examples will be explained as other examples of embodiments of the invention.

FIRST EMBODIMENT

In the description of the first embodiment of the invention, an example will be explained in which the map displaying apparatus prevents interference among road names when displaying the road names so as to be positioned along the roads. Firstly, the configuration of a map displaying system according to the first embodiment will be explained. FIG. 1 is a functional block diagram of the configuration of the map displaying system according to a first embodiment. As shown in the drawing, the map displaying system includes a map-data distributing server 10, a map displaying apparatus 20, and a network 15 that connects the map-data distributing server 10 to the map displaying apparatus 20.

The map-data distributing server 10 is a server that distributes map data to the map displaying apparatus 20, the map data including sets of curved-point coordinates, identification information, and a road name of each road used for displaying the roads in the map data. The network 15 is a network that wirelessly connects the map-data distributing server 10 to the map displaying apparatus 20.

The map displaying apparatus 20 includes an input unit 210, a displaying unit 220, a positioning-information receiving unit 230, a communicating unit 240, a memory unit 250, and a control unit 260. The input unit 210 is an input device used for inputting requests and instructions of a user and may be a ten-key pad, for example. The displaying unit 220 is a display device that displays map display data generated by the map displaying apparatus 20 and may be an LCD, for example.

The positioning-information receiving unit 230 is a processing unit that obtains a current position, like a longitude and a latitude, of the map displaying apparatus 20, out of positioning information received from a GPS satellite and includes a GPS antenna 231. The GPS antenna 231 is an antenna that receives electric waves in one of the L-band and the S-band that are transmitted from the GPS satellite and have been subject to spread spectrum processing.

Figures 3, 4:
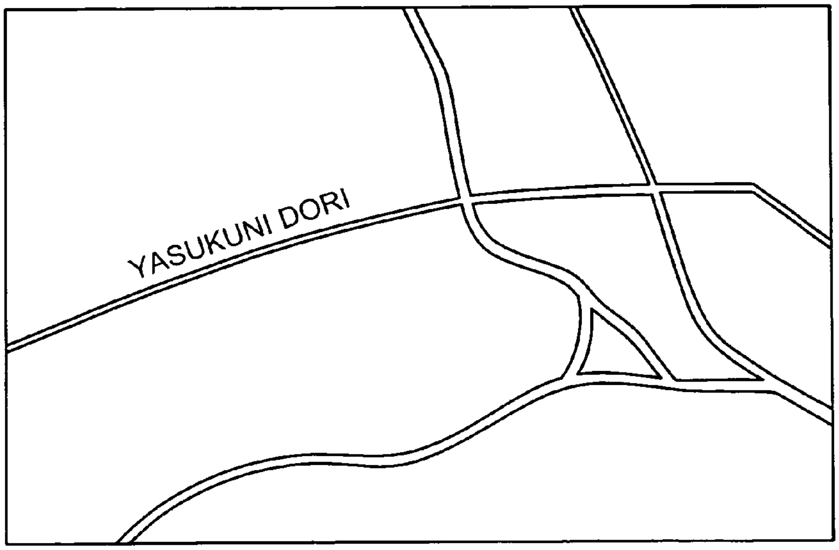
FIG. 3 is a drawing of an example of a road-name table to be received, as a part of map data, by the map displaying apparatus shown in FIG. 1 from the map-data distributing server.
FIG. 4 is a drawing of an example in which a road name is displayed by the map displaying apparatus shown in FIG. 1, using letters of the alphabet, which are rotatable.

The memory unit 250 includes a road-identification-information table memory 251, a road-name table memory 252, a display data memory 253, a display data sub-memory 254, and a display-data provisional memory 255. The road-identification-information table memory 251 is a memory that stores therein a road-identification-information table that is received, as a part of the map data, by the map displaying apparatus 20 from the map-data distributing server 10. The road-name table memory 252 is a memory that stores therein a road-name table that is received, as a part of the map data, by the map displaying apparatus 20 from the map-data distributing server 10. Next, the road-identification-information table and the road-name table that are respectively stored in the road-identification-information table memory 251 and the road-name table memory 252 included in the map displaying apparatus 20 shown in FIG. 1 will be explained. FIG. 2 is a drawing of an example of the road-identification-information table to be received, as a part of the map data, by the map displaying apparatus 20 shown in FIG. 1 from the map-data distributing server 10. FIG. 3 is a drawing of an example of the road-name table to be received, as a part of the map data, by the map displaying apparatus 20 shown in FIG. 1 from the map-data distributing server 10.

As shown in FIG. 2, the road identification information correspondence tale shows, in correspondence, road identification information and sets of curved-point coordinates for each of the roads. To be more specific, the road identified with identification information "Road 1" includes as many as N curved points, namely the curved point (x11, y11) to the curved point (x1N, y1N). Likewise, the road identified with identification information "Road 2" includes as many as N curved points, namely the curved point (x21, y21) to the curved point (x2N, y2N). Each of all the roads shown in the drawing includes as many as N curved points for the sake of convenience in explanation; however, an arrangement is also acceptable where different roads have different numbers of curved points. As shown in FIG. 3, the road-name table shows, in correspondence, pieces of road identification information and road names. To be more specific, the road identified with the identification information "Road 1" is "YASUKUNI DORI", and the road identified with the identification information "Road 2" is "AOYAMA DORI".

With reference to FIG. 1 again, the display data memory 253 is a memory unit that stores therein actual map display data that corresponds to a display screen of the displaying unit 220 and may be a color image memory having 320 pixels by 240 pixels, for example. The display data sub-memory 254 is a memory that stores therein one or more road names that are determined to be displayed in the display data memory 253. More specifically, the display data sub-memory 254 is a memory that checks to see if there is interference between the one or more road names determined to be displayed in the display data memory 253 and a road name temporarily displayed in the display-data provisional memory 255 and may be a monochrome image memory having 320 pixels by 240 pixels, for example. The display-data provisional memory 255 is a temporary memory that temporarily displays a road name to check to see if it is possible to position the road name and may have a memory size of 100pixels by 100 pixels, for example.

The control unit 260 is a controller that controls the map displaying apparatus 20 as a whole. The control unit 260 receives requests and instructions from a user and controls the processing performed by other constituent elements and the flows of data. More specifically, the control unit 260 includes a road-information obtaining unit 261, a map-display-area determining unit 262, a road-display judging unit 263, and a map-display-data generating unit 264. The road-information obtaining unit 261 is a processing unit that obtains, out of the map data distributed by the map-data distributing server 10, the sets of curved-point coordinates, the identification information, and the road name of each of the roads, used for displaying the roads in the map data.

The map-display-area determining unit 262 is a processing unit that determines a display area to be displayed, out of map data that is for the surrounding area of a current position of the map displaying apparatus 20 and that has been obtained by the positioning-information receiving unit 230. The road-display judging unit 263 is a judging unit that judges whether the sets of curved-point coordinates of each of the roads that has been obtained by the road-information obtaining unit 261 and are in correspondence with the identification information are present in the display area determined by the map-display-area determining unit 262.

The map-display-data generating unit 264 is a processing unit that, when the road-display judging unit 263 has judged that the sets of curved-point coordinates of the road used for displaying the road are present in the display area, generates map display data that is for displaying the road by connecting the spaces between the curved-point coordinates of the road with lines and that includes the road name arranged to be positioned along the road, while interference is prevented between each character or symbol representing the name of the displayed road and other identification names included in the map data.

The map-display-data generating unit 264 generates, when each character or symbol used for displaying the road name is individually rotatable, map display data that includes the road name arranged to be positioned along the road from the left to the right of the display screen, while interference is prevented between each character or symbol used for displaying the name and any of the other identification names included in the map data. Next, an example will be explained in which the map displaying apparatus 20 shown in FIG. 1 displays road names using letters of the alphabet, which are rotatable.

Figure 5:
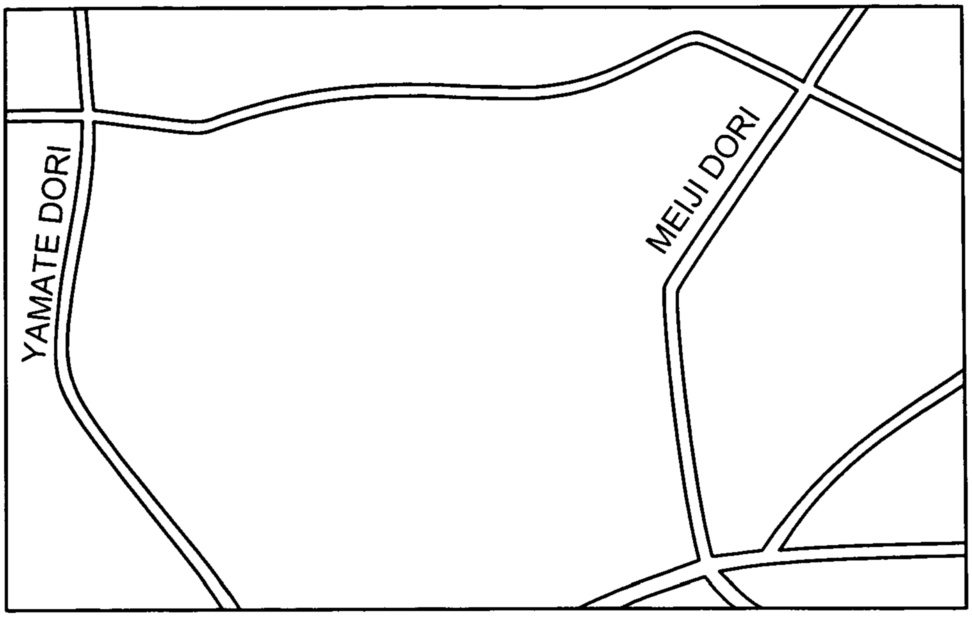
FIG. 5 is a drawing of another example in which road names are displayed by the map displaying apparatus shown in FIG. 1, using letters of the alphabet, which are rotatable.

FIG. 4 is a drawing of an example in which a road name is displayed by the map displaying apparatus 20 shown in FIG. 1, using letters of the alphabet, which are rotatable. FIG. 5 is a drawing of another example in which road names are displayed, by the map displaying apparatus 20 shown in FIG. 1, using letters of the alphabet, which are rotatable. As shown in FIG. 4 and FIG. 5, when the road names are displayed using letters of the alphabet, for example, "YASUKUNI DORI" and "MEIJI DORI", the map-display-data generating unit 264 always displays each of the road names from the left to the right so as to be positioned along the curves of the roads, regardless of the relative positions of the road names on the display screen.

Next, the direction in which a road name is displayed will be further explained, using an example in which the map displaying apparatus 20 shown in FIG. 1 displays the road name using letters of the alphabet, which are rotatable. In order to determine the direction in which the road name is to be displayed, the map-display-data generating unit 264 at first decides if the road name display starts from the starting point of the road data or the ending point of the road data. The sets of curved-point coordinates used for displaying each road are arranged as shown in the road-identification-information table in FIG. 2. The map-display-data generating unit 264 selects two points out of these curved points and starts the road name display from the starting point of the road data, if xii+1=xii is satisfied and starts the road name display from the ending point of the road data, if xii+1<xii is satisfied. As a result, each of the road names is always displayed from the left to the right of a display screen. The two points selected may be two points at the beginning, or may be a starting point and an ending point.

Figure 6:
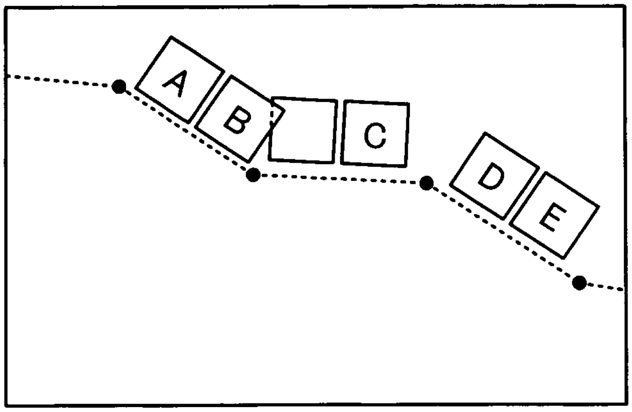
FIG. 6 is a drawing of an example in which the map displaying apparatus shown in FIG. 1 prevents interference among any of characters or symbols included in a road name, using a display-data provisional memory.

With reference to FIG. 1 again, when it is likely that there is interference among any of characters or symbols included in a road name or that there is interference between any one of the characters or symbols included in the road name and another road name included in the map data, the map-display-data generating unit 264 arranges the road name so as to be positioned along the road, while preventing the interference among any of the characters or symbols included in the road name, and also between any one of the characters or symbols included in the road name and another road name included in the map data. Next, an example will be explained in which the map displaying apparatus shown in FIG. 1 prevents interference among any of the characters or symbols included in a road name, using the display-data provisional memory 255. FIG. 6 is a drawing of an example in which interference among any of characters or symbols included in a road name is prevented by the map displaying apparatus shown in FIG. 1, using the display-data provisional memory 255.

As shown in the drawing, the map-display-data generating unit 264 displays the road name in the display-data provisional memory 255, while checking to see if there is interference between each character or symbol used for displaying the road name positioned along the road and any other character or symbol. To be more specific, when each character or symbol included in the road name is displayed so as to be positioned along the inclinations of the lines connecting the curved points of the road and if any character or symbol interferes with a preceding character or symbol, the map-display-data generating unit 264 moves the pixel range of the character or symbol interfering with the preceding character or symbol. For example, as shown in FIG. 6, when the pixel range of the alphabet "C" interferes with the pixel range of the alphabet "A" and "B" preceding the alphabet "C", the map-display-data generating unit 264 displays the alphabet "C" after moving it to the next pixel range.

Figure 7:
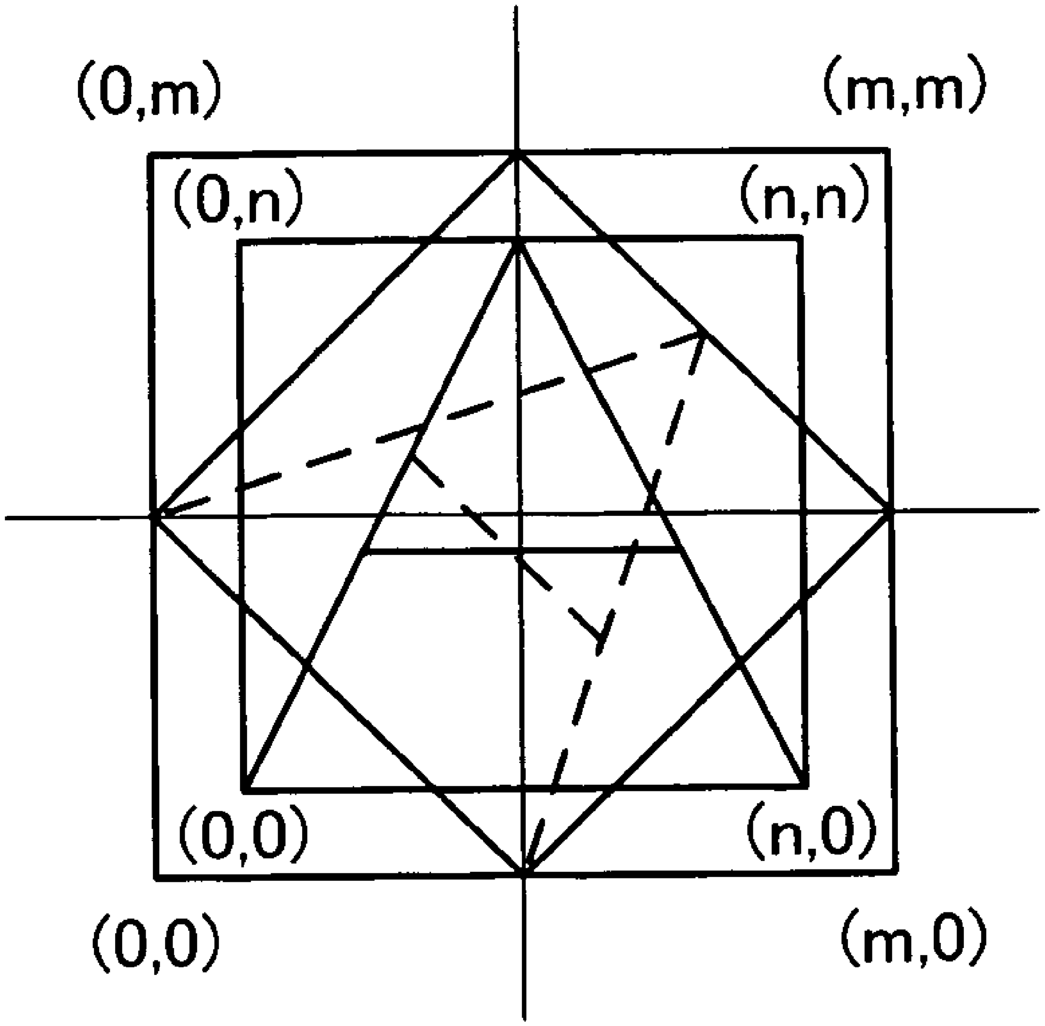
FIG. 7 is a drawing of an example in which the map displaying apparatus shown in FIG. 1 sets a judgment-purpose pixel range.

Further, when each character or symbol is rotated and displayed, in order to judge if each character or symbol interferes with another character or symbol because of the rotation, the map-display-data generating unit 264 uses a judgment-purpose pixel range that is larger than a pixel range for displaying any single character or symbol and setting the judgment-purpose pixel range into the display data memory 253 and the display data sub-memory 254. An example will be explained in which the map displaying apparatus 20 shown in FIG. 1 sets the larger judgment-purpose pixel range. FIG. 7 is a drawing of an example in which the map displaying apparatus 20 shown in FIG. 1 sets a judgment-purpose pixel range.

As shown in the drawing, because a letter of the alphabet is displayed in a pixel range of n pixels by n pixels, the map-display-data generating unit 264 judges if there is interference among any of the characters or symbols included in the road name, using an enveloping range of m pixels by m pixels covering an area required for rotation of each letter of the alphabet, so that none of the letters of the alphabet interfere with any other letter of the alphabet even after they freely rotate. For example, the values may be selected to satisfy $n=10$ and $m=15$ pixels. When checking to see if there is interference between the road name and another road name in the map that has already been determined to be displayed, the map-display-data generating unit 264 judges if there will be interference by comparing the memory area of the display-data provisional memory 255 with the memory area of the display data sub-memory 254.

As explained so far, an arrangement is made in which, in order to judge if each character or symbol included in a character symbol string representing a road name interferes with another character or symbol, the map-display-data generating unit 264 uses the judgment-purpose pixel range that is larger than the pixel range used for displaying any single character or symbol and checks to see if the pixel range of any other character interferes with the pixel range of the judgment-purpose pixel range. With this arrangement, it is possible to judge if there is interference between each character or symbol included in the character symbol string representing the road name and any other character or symbol, without rotating each character or symbol included in the character symbol string. Thus, it is possible to perform the interference judging processing easily.

Figure 8:
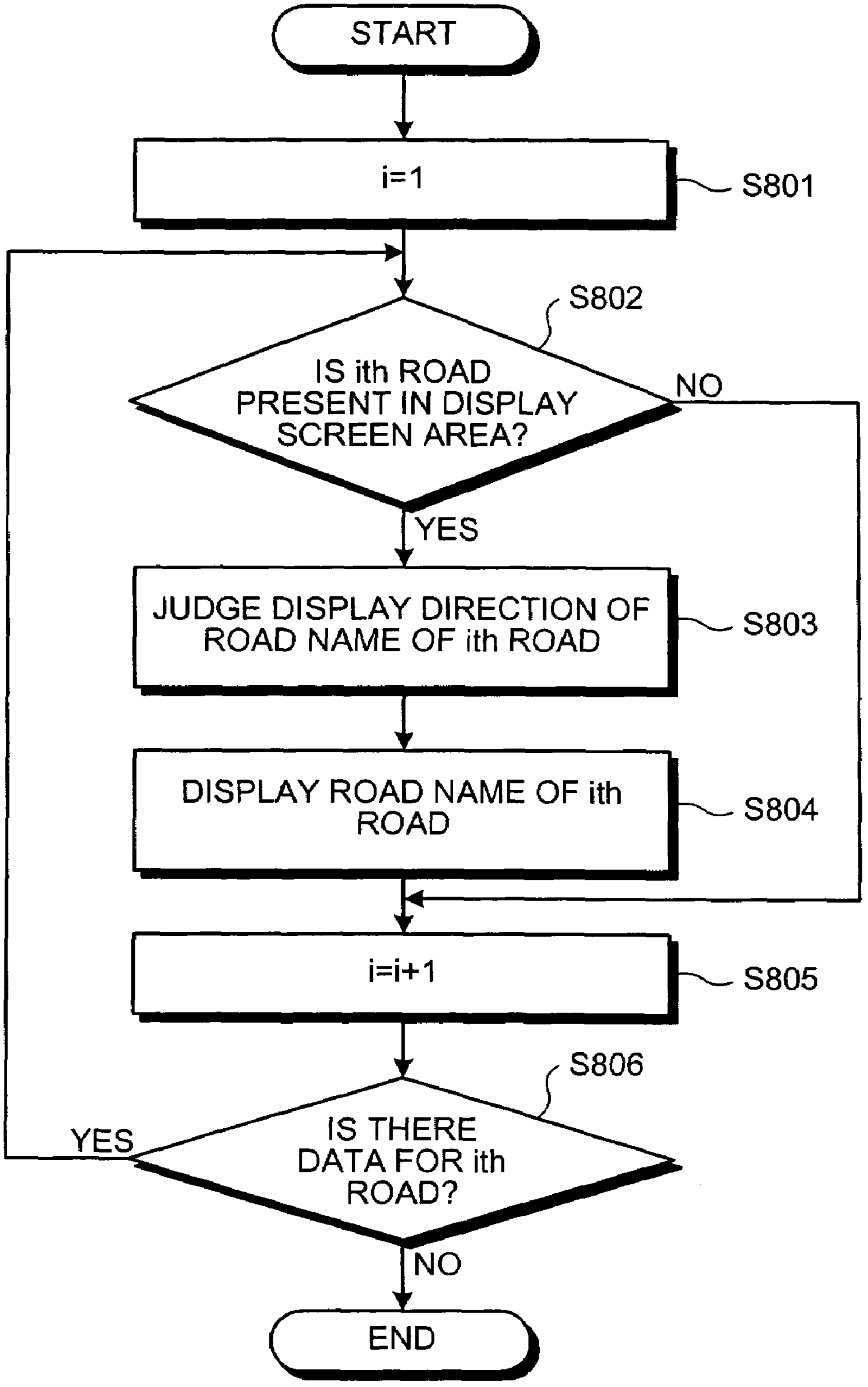
FIG. 8 is a flow chart of a road name displaying procedure to be performed by the map displaying apparatus shown in FIG. 1.

Next, a road name displaying procedure performed by the map displaying apparatus 20 shown in FIG. 1 will be explained. FIG. 8 is a flow chart of the road name displaying procedure performed by the map displaying apparatus 20 shown in FIG. 1. As shown in the drawing, in order to sequentially display the road names that are in correspondence with the pieces of road identification information shown in the road-name table, the map-display-data generating unit 264 initializes a pointer i that indicates a corresponding one of the pieces of road identification information so that "1=1" is satisfied (step S801). Then, the road-display judging unit 263 checks to see if the ith road is present in a display screen area determined by the map-display-area determining unit 262 (step S802). As a result, when the ith road is not present in the display screen area determined by the map-display-area determining unit 262 (step S802: NO), the map-display-data generating unit 264 advances to step S805.

On the contrary, when the ith road is present in the display screen area determined by the map-display-area determining unit 262 (step S802: YES), the map-display-data generating unit 264 judges a display direction of the road name of the ith road (step S803). In order to judge the display direction of the road name of the ith road, the map-display-data generating unit 264 selects two points out of a series of curved-point coordinates for the ith road and starts the road name display from the starting point of the road data, if $xii+1=xii$ is satisfied, and starts the road name display from the ending point of the road data, if $xii+1<xii$ is satisfied. The map-display-data generating unit 264 displays the road name of the ith road (step S804). Further, the map-display-data generating unit 264 adds 1 to the pointer i that indicates a corresponding road (step S805) and checks to see if the road-identification-information table includes data for the ith road (step S806).

As a result, when the road-identification-information table includes no data for the ith road (step S806: NO), the map-display-data generating unit 264 completes this procedure. On the contrary, when the road-identification-information table includes the data for the ith road (step S806: YES), the map-display-data generating unit 264 returns to step S802 and repeats the procedure from step S802 through step S805 until the road name of the last road is displayed.

Figure 9:
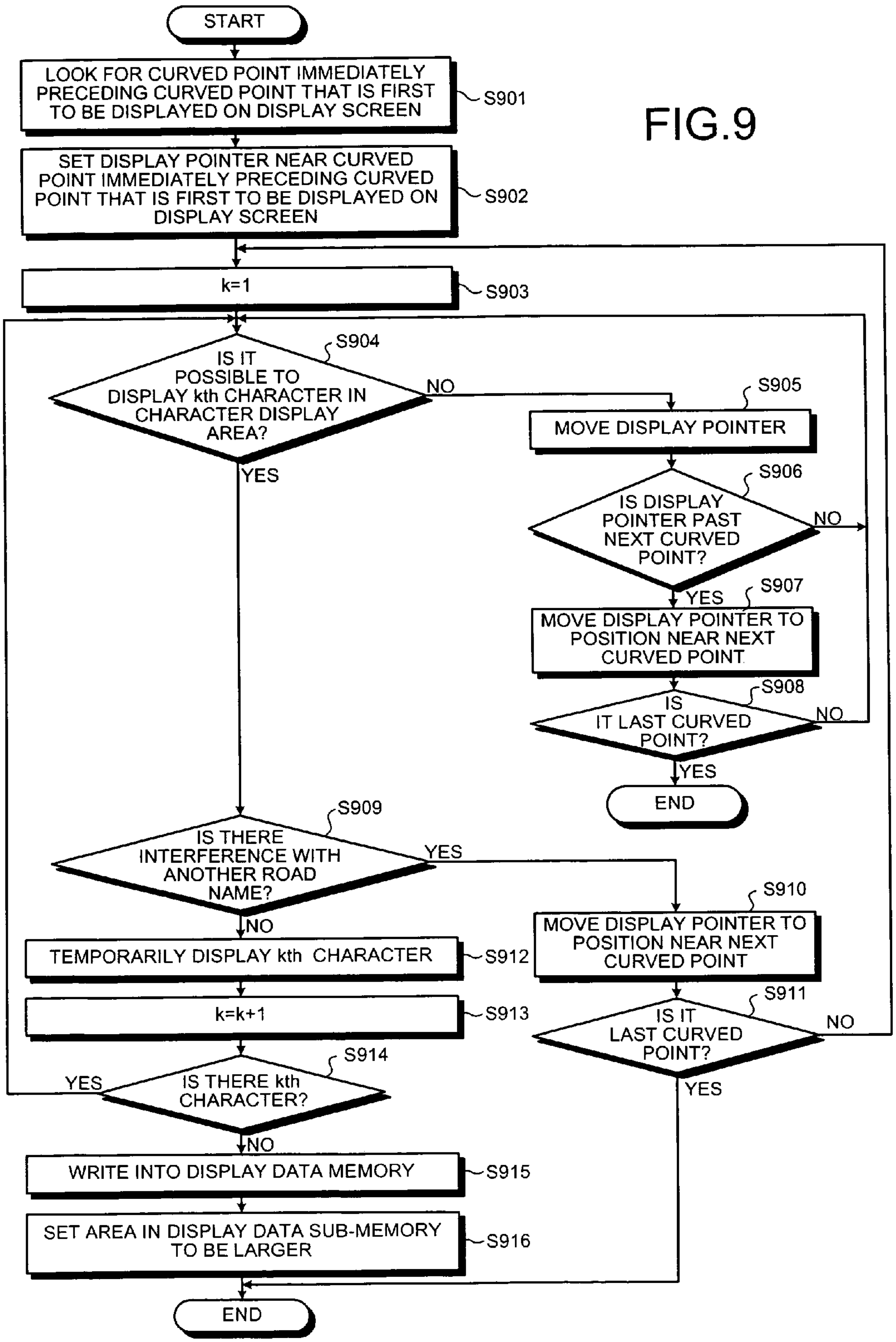
FIG. 9 is a flow chart of the details of the road name displaying procedure for an ith road, shown in FIG. 8.

Next, the procedure, shown in FIG. 8, for displaying the road name of the ith road will be explained further in detail. FIG. 9 is a flow chart of the details of the road name displaying procedure for the ith road shown in FIG. 8. As shown in the drawing, the map-display-data generating unit 264 looks for a curved point immediately preceding the curved point that is first to be displayed on the display screen when viewed from the display direction of the road name obtained in the procedure shown in FIG. 8 (step S901). When the first curved point is already on the display screen (e.g. the road is cut off), this point is used as the first curved point within the display screen area. The road name is temporarily displayed on the screen in the display-data provisional memory 255, until the road name is eventually written into the display data memory 253 at step S915.

Then, the map-display-data generating unit 264 sets the display pointer on the screen so as to be positioned near the curved point immediately preceding the curved point that is first to be displayed on the display screen (step S902). Further, the map-display-data generating unit 264 initializes a pointer k indicating the order of the characters or symbols included in the character symbol strings used for displaying the road names in the road-name table, so that "k=1" is satisfied (step S903).

Subsequently, the map-display-data generating unit 264 checks to see if it is possible to display bit map data for the kth character so as to be positioned along the inclination of the road and within the pixel range of n pixels by n pixels positioned near the display pointer on the screen, without interfering with the preceding character or symbol (step S904). As a result, if it is not possible to display the bit map data for the kth character so as to be positioned along the inclination of the road and within the pixel range positioned near the display pointer on the screen, without interfering with the preceding character or symbol (step S904: NO), the map-display-data generating unit 264 moves the display pointer along the inclination of the road (step S905).

The map-display-data generating unit 264 then checks to see if the display pointer is past the next curved point (step S906). It should be noted that, because the display pointer moves on a line connecting the curved points, the map-display-data generating unit 264 is able to judge easily if the display pointer has reached the next curved point or is past the next curved point.

As a result, when the display pointer is not past the next curved point (step S906: NO), the map-display-data generating unit 264 returns to step S904. On the contrary, when the display pointer is past the next curved point (step S906: YES), the map-display-data generating unit 264 moves the display pointer to a position near the next curved point (step S907).

Subsequently, the map-display-data generating unit 264 checks to see if the curved point to which the display pointer has moved is the last curved point (step S908). As a result, when the curved point to which the display pointer has moved is the last curved point (step S908: YES), the map-display-data generating unit 264 completes this procedure. On the contrary, when the curved point to which the display pointer has moved is not the last curved point (steps S908: NO), the map-display-data generating unit 264 returns to step S904.

On the other hand, if it is possible to display the bit map data for the kth character so as to be positioned along the inclination of the road and within the pixel range positioned near the display pointer on the screen, without interfering with the preceding character or symbol (step S904: YES), the map-display-data generating unit 264 checks to see if there is interference with another road name that has already been determined to be displayed (step S909). In other words, the map-display-data generating unit 264 checks to see if there is interference by comparing the memory area of the display-data provisional memory 255 with the memory area of the display data sub-memory 254. As a result, when there is interference with another road name that has already been determined to be displayed (step S909: YES), the map-display-data generating unit 264 moves the display pointer to a position near the next curved point (step S910).

Subsequently, the map-display-data generating unit 264 checks to see if the curved point to which the display pointer has moved is the last curved point (step S911). As a result, when the curved point to which the display pointer has moved is the last curved point (step S911: YES), the map-display-data generating unit 264 completes this procedure. On the contrary, when the curved point to which the display pointer has moved is not the last curved point (steps S911: NO), the map-display-data generating unit 264 returns to step S903 and starts the displaying procedure again starting with the first character in the road name.

On the contrary, when there is no interference with another road name that has already been determined to be displayed (step S909: NO), the map-display-data generating unit 264 temporarily displays the kth character of the road name in the display-data provisional memory 255 (step S912), and adds 1 to the pointer k (step S913). The map-display-data generating unit 264 then checks to see if the road name shown in the road-name table has the kth character (step S914). As a result, when the road name shown in the road-name table has the kth character (step S914: YES), the map-display-data generating unit 264 returns to step S904 and repeats the procedure from step S904 through step S913.

On the other hand, when the road name shown in the road-name table does not have the kth character (step S914: NO), the map-display-data generating unit 264 writes the road name that has been displayed temporarily in the display-data provisional memory 255 into the display data memory 253 (step S915). The map-display-data generating unit 264 then sets the pixel range of the road name being a little larger into the display data sub-memory 254 so that there will be no interference when the next character is displayed (step S916).

As explained so far, according to the first embodiment, an area in which a map is to be displayed is determined, and the curved-point coordinate information and the name information of the road to be displayed in the determined display area are obtained out of the map data transmitted from the map-data distributing server. A display position is determined for each character or symbol included in the character symbol string indicated in the name information so that each character or symbol is positioned along the road without interfering with any other character or symbol. Accordingly, the map display data used for displaying each character or symbol at the respective determined position is generated. Thus, it is possible to prevent the interference and to display the pieces of name information of the roads in such a manner that they are easy to see.

Further, when the display angle of each of all the characters or symbols included in the character symbol string indicated in the name information is rotatable, the display angle of each character or symbol is determined so that each character or symbol is positioned along the road, and also the map display data is generated so that the characters or symbols included in the character symbol string are sequentially displayed from the left to the right of the display screen. Thus, it is possible to display the pieces of name information of the roads in such a manner that they are easy to see.

Further, in order to judge if each character or symbol included in the character symbol string indicated in the name information interferes with another character or symbol, the judgment character pixel range is used, which is larger than a pixel range used for displaying any single character or symbol. It is checked to see if a pixel range of any other character interferes with the judgment character pixel range. Thus, it is possible to prevent the interference and to display the pieces of name information of the roads in such a manner that they are easy to see.

SECOND EMBODIMENT

In the description of the first embodiment, the example is explained in which the interference between the road names are prevented when the map displaying apparatus 20 displays the road names so that they are positioned along the roads; however, the present invention is not limited to this example. It is possible to apply the present invention to an example in which the map displaying apparatus 20 prevents a road name of a single road from being displayed in duplication. In the description of the second embodiment of the invention, the example in which the map displaying apparatus 20 prevents a road name of a single road from being displayed in duplication will be explained. Explanation of the features that are in common between the first embodiment and the second embodiment will be omitted.

Figure 10:
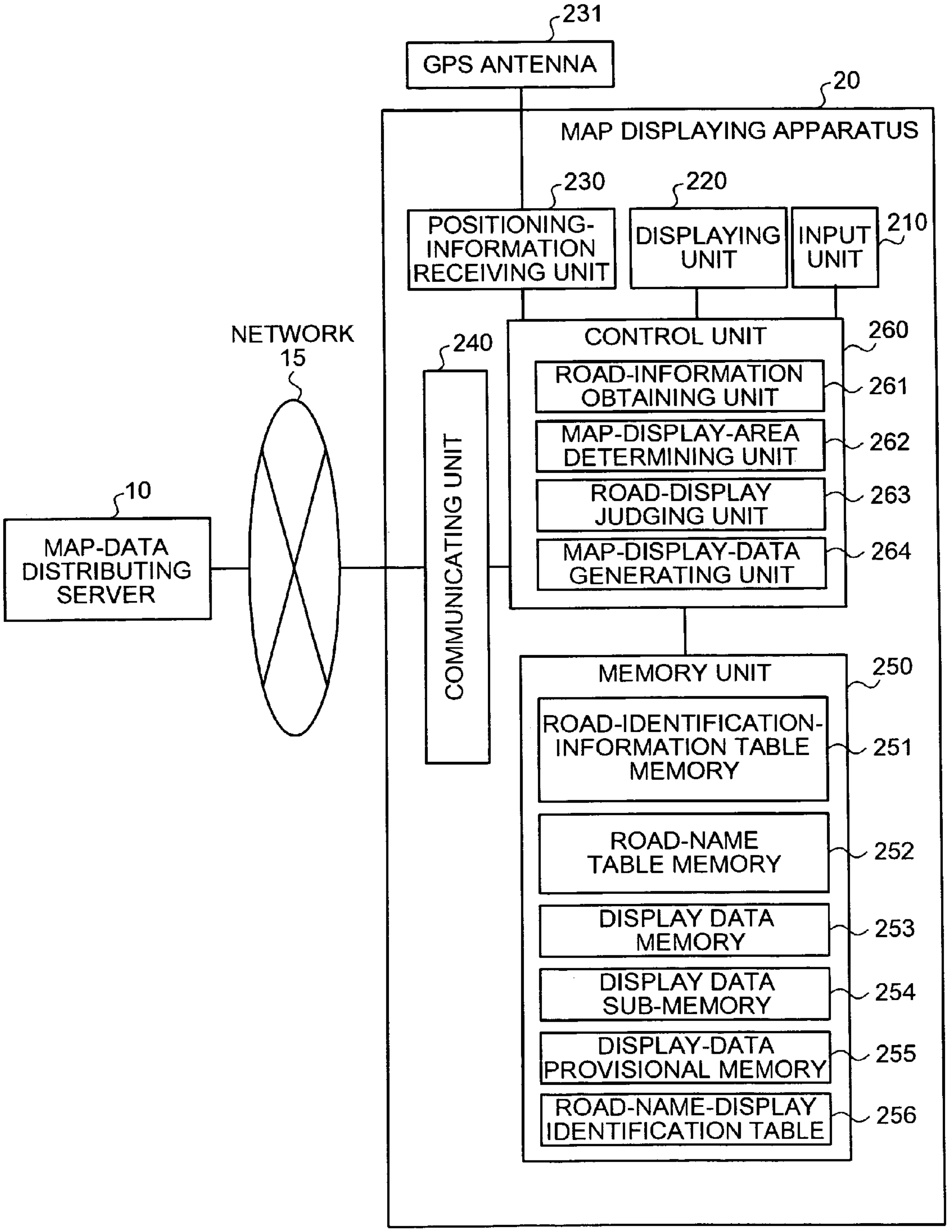
FIG. 10 is a functional block diagram of the configuration of a map displaying system according to a second embodiment of the invention.
Figures 11, 12:
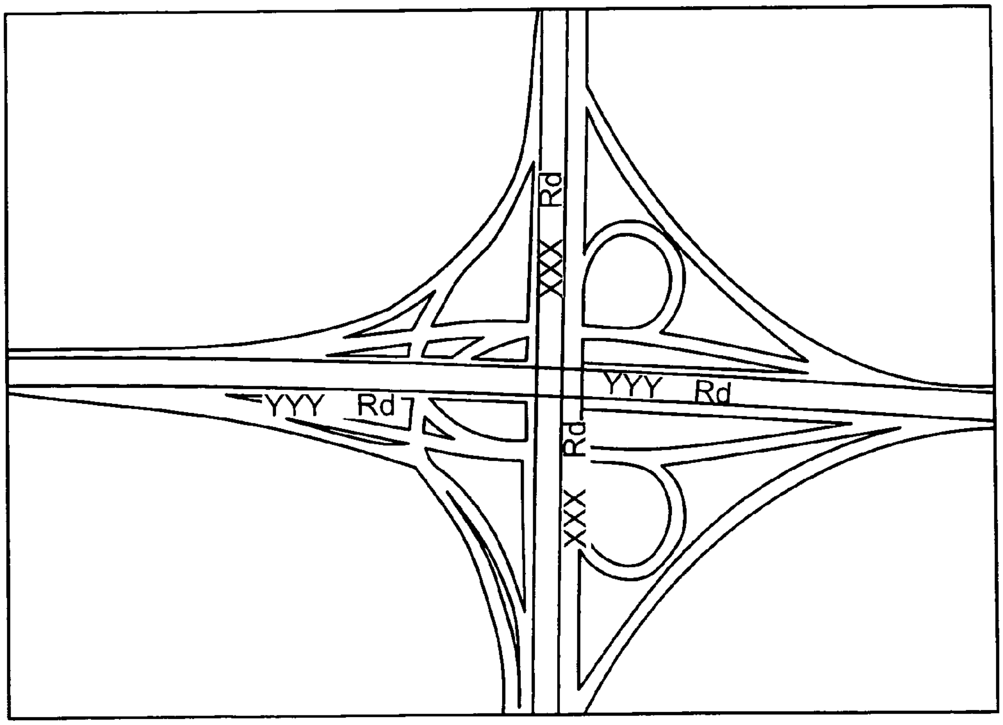
FIG. 11 is a drawing of an example of a road-name-display identification table included in the map displaying apparatus shown in FIG. 10.
FIG. 12 is a drawing of an example in which each of road names for the roads is displayed in duplication by the map displaying apparatus shown in FIG. 10.

Firstly, the configuration of a map display system according to the second embodiment of the invention will be explained. FIG. 10 is a functional block diagram of the configuration of the map displaying system according to the second embodiment. As shown in the drawing, the only difference from the functional block diagram for the first embodiment shown in FIG. 1 is a road-name-display identification table 256. Accordingly, the road-name-display identification table 256 included in the map displaying apparatus 20 shown in FIG. 10 will be explained. FIG. 11 is a drawing of an example of the road-name-display identification table 256 included in the map displaying apparatus 20 shown in FIG. 10.

As shown in the drawing, the road-name-display identification table 256 is a table used for identifying if a road name has already been displayed in the display data memory 253. The map-display-data generating unit 264 writes the road names displayed in the display data memory 253 sequentially into the road-name-display identification table 256. By ensuring that the road-name-display identification table 256 does not include each road name to be displayed before displaying the road name, the map-display-data generating unit 264 is able to prevent any of the road names that have already been displayed from being displayed again in duplication.

Figure 13:
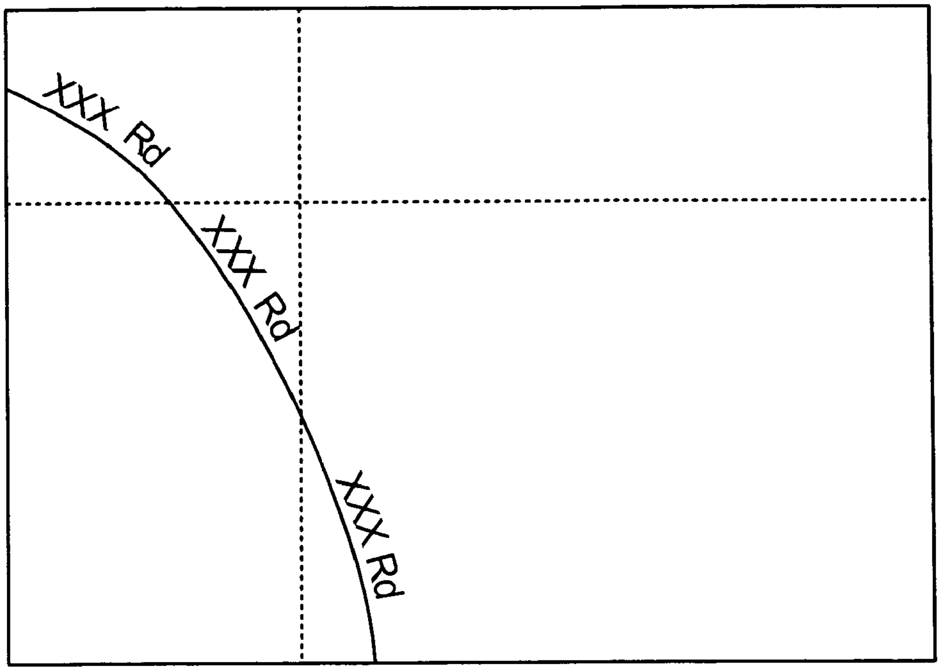
FIG. 13 is a drawing of another example in which the road name of a single road is displayed in duplication by the map displaying apparatus shown in FIG. 10.

Further, an example will be explained in which a road name of a single road is displayed in duplication by the map displaying apparatus 20 shown in FIG. 10. FIG. 12 is a drawing of an example in which each of the road names for the roads is displayed in duplication by the map displaying apparatus 20 shown in FIG. 10. FIG. 13 is a drawing of another example in which the road name of a single road is displayed in duplication by the map displaying apparatus 20 shown in FIG. 10.

As shown in FIG. 12, for expressways and large boulevards that branch off to a plurality of directions depending on which way one travels, data for a single road is treated as data for two or more different roads. Accordingly, the map displaying apparatus 20 displays, a plurality of times, the road name for a single road. Also, as shown in FIG. 13, the position to be displayed happens to include a border (shown with dotted lines) of a mesh in the map data, and the road happens to be cut off at the border of the mesh, because data for a single road is treated as data for two or more different roads, the map displaying apparatus 20 displays the road name for a single road three times. A "mesh" in this case denotes each of the units into which a piece of map data distributed by the map-data distributing server 10 can be divided. When a road extends through more than one mesh, the processing for displaying the road name is performed while the road extending through these meshes, being a single road in fact, is treated as different roads.

Figure 14:
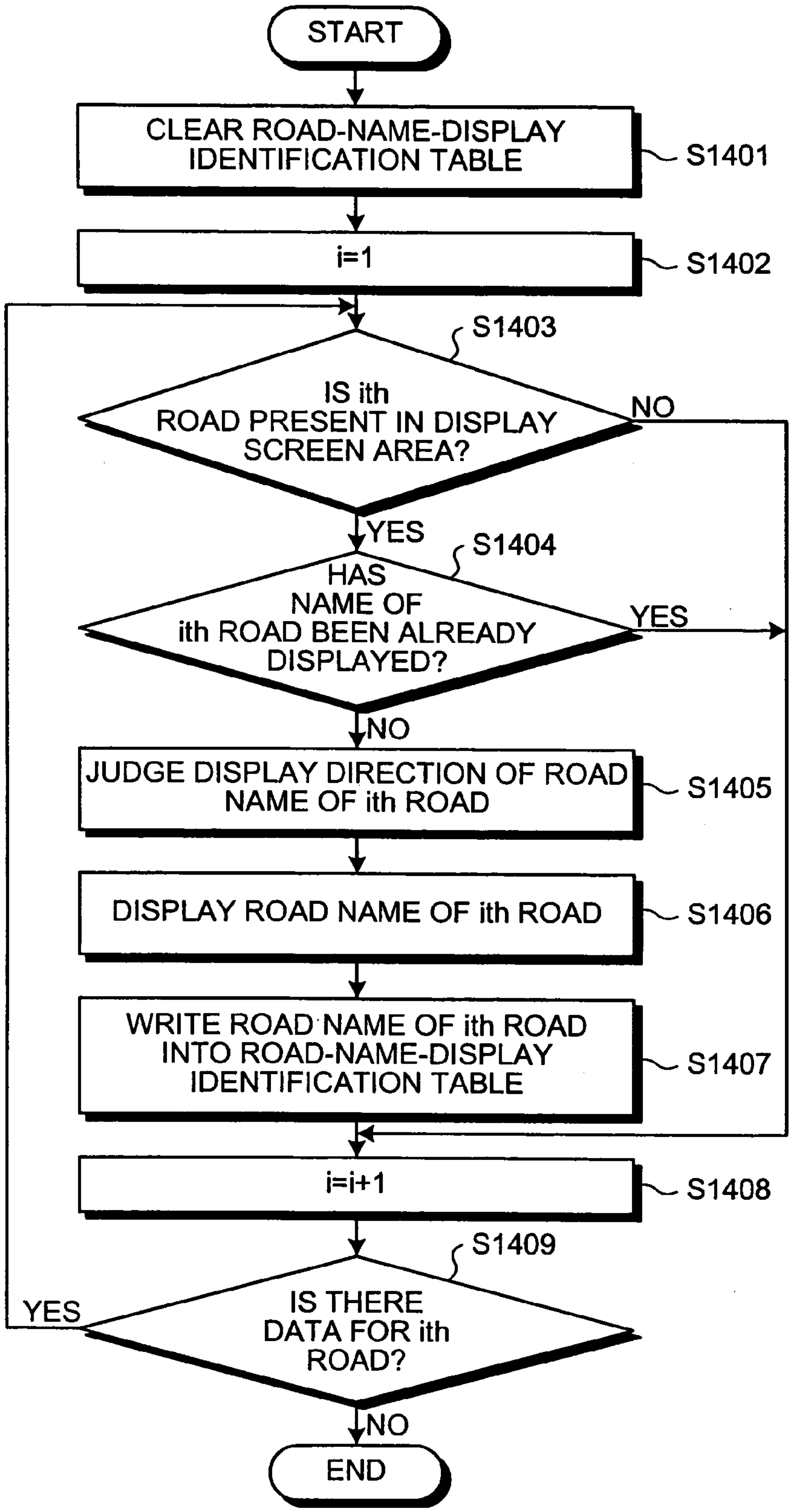
FIG. 14 is a flow chart of a road name displaying procedure to be performed by the map displaying apparatus shown in FIG. 10.

Next, the road name displaying procedure performed by the map displaying apparatus 20 shown in FIG. 10 will be explained. FIG. 14 is a flow chart of the road name displaying procedure performed by the map displaying apparatus 20 shown in FIG. 10. As shown in the drawing, when displaying a road name, the map-display-data generating unit 264 clears the road-name-display identification table 256 (step S1401).

Then, in order to sequentially display the road names that are in correspondence with the pieces of road identification information shown in the road-name table, the map-display-data generating unit 264 initializes a pointer i that indicates a corresponding one of the pieces of road identification information so that "i=1" is satisfied (step S1402). Further, the road-display judging unit 263 checks to see if the ith road is present in a display screen area determined by the map-display-area determining unit 262 (step S1403). As a result, when the ith road is not present in the display screen area determined by the map-display-area determining unit 262 (step S1403: NO), the map-display-data generating unit 264 advances to step S1408.

On the contrary, when the ith road is present in the display screen area determined by the map-display-area determining unit 262 (step S1403: YES), the map-display-data generating unit 264 checks the road-name-display identification table 256 to judge whether the road name for the ith road has already been displayed (step S1404). As a result, when the road name for the ith road has already been displayed (step S1404: Yes), the map-display-data generating unit 264 advances to step S1408.

On the other hand, when the road name for the ith road has not been displayed yet (step S1404: NO), the map-display-data generating unit 264 judges the display direction of the road name of the ith road (step S1405). The map-display-data generating unit 264 selects two points out of the sets of curved-point coordinates for the ith road and starts the road name display from the starting point of the road data, if xii+1=xii is satisfied and starts the road name display from the ending point of the road data, if xii+1<xii is satisfied. The map-display-data generating unit 264 displays the road name of the ith road (step S1406). Further, the map-display-data generating unit 264 writes the road name of the ith road into the road-name-display identification table 256 (step S1407). The map-display-data generating unit 264 then adds 1 to the pointer i (step S1408) and checks to see if the road-identification-information table includes data for the ith road (step S1409).

As a result, when the road-identification-information table does not include data for the ith road (step S1409: NO), the map-display-data generating unit 264 completes this procedure. On the contrary, when the road-identification-information table includes the data for the ith road (step S1409: YES), the map-display-data generating unit 264 returns to step S1403 and repeats the procedure from step S1403 through step S1408 until the road name of the last road is displayed.

As explained so far, according to the second embodiment, before data is generated for displaying the character symbol string indicated name information that corresponds to a road so as to be positioned along the road, it is judged whether data has previously been generated for displaying the character symbol string indicated in the name information in the determined display area. If such data has previously been generated, the data used for displaying the character symbol string indicated in the name information of the road will not be generated. Thus, it is possible to eliminate displaying a road name of a single road in duplication and to display the pieces of name information of the roads in such a manner that they are easy to see.

MODIFICATION EXAMPLES

The present invention is not limited to the embodiments described above. It is possible to modify the present invention as described in the examples below.

First Modification Example

In the description of the first embodiment, the example in which each character or symbol used for indicating a road name is rotatable is explained; however, the present invention is not limited to this example. It is acceptable to apply the present invention to an example in which each character or symbol used for displaying a road name is not rotatable. For example, the present invention may be applied to an example in which the characters used for displaying road names are Chinese characters, which are not rotatable due to restriction from an operating system.

When the display angle of each character or symbol included in a character symbol string representing a road name is not rotatable, the map-display-data generating unit 264 determines a direction on a display screen in which the characters or symbols included in the character symbol string are to be sequentially displayed, based on the inclination angle of the road with respect to a predetermined direction of the display screen, and generates map display data for sequentially displaying the character symbol string in the determined direction.

More specifically, when the display angle of each character or symbol included in the character symbol string representing the road name is not rotatable, the map-display-data generating unit 264 displays the characters or symbols included in the character symbol string from the left to the right if the road is inclined at an angle smaller than a predetermined angle with respect to the horizontal direction of the display screen and displays the characters or symbols included in the character symbol string from the top to the bottom if the road is inclined at an angle equal to or larger than a predetermined angle with respect to the horizontal direction of the display screen.

For example, when the character symbol string representing the road name includes Chinese characters, the map-display-data generating unit 264 displays the characters or symbols included in the character symbol string from the left to the right if the inclination angle of the road with respect to the horizontal direction of the display screen is smaller than 60 degrees and displays the characters or symbols included in the character symbol string from the top to the bottom if the inclination angle of the road with respect to the horizontal direction of the display screen is equal to or larger than 60 degrees.

Figure 15:
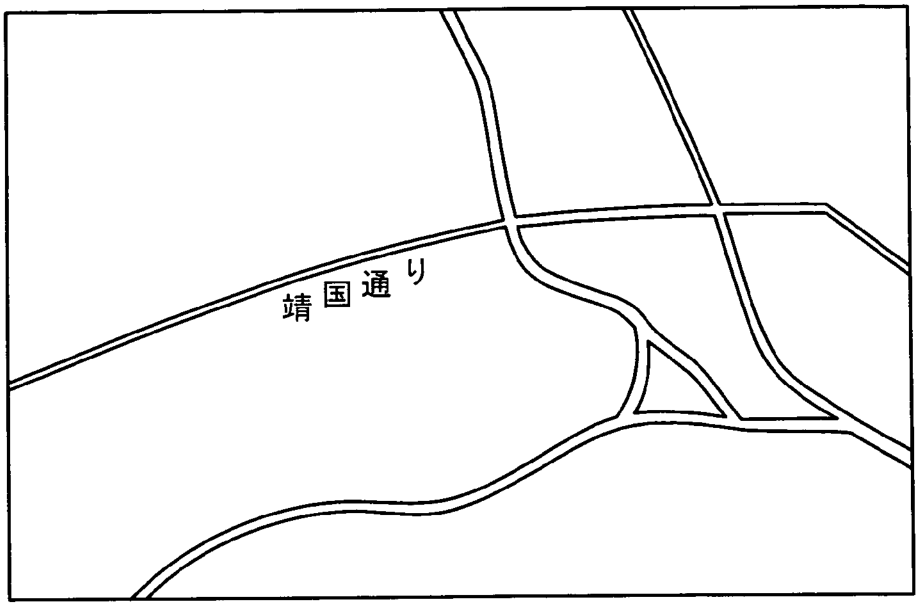
FIG. 15 is a drawing of an example in which a road name is displayed by the map displaying apparatus shown in FIG. 1, using Chinese characters, which are not rotatable.
Figure 16:
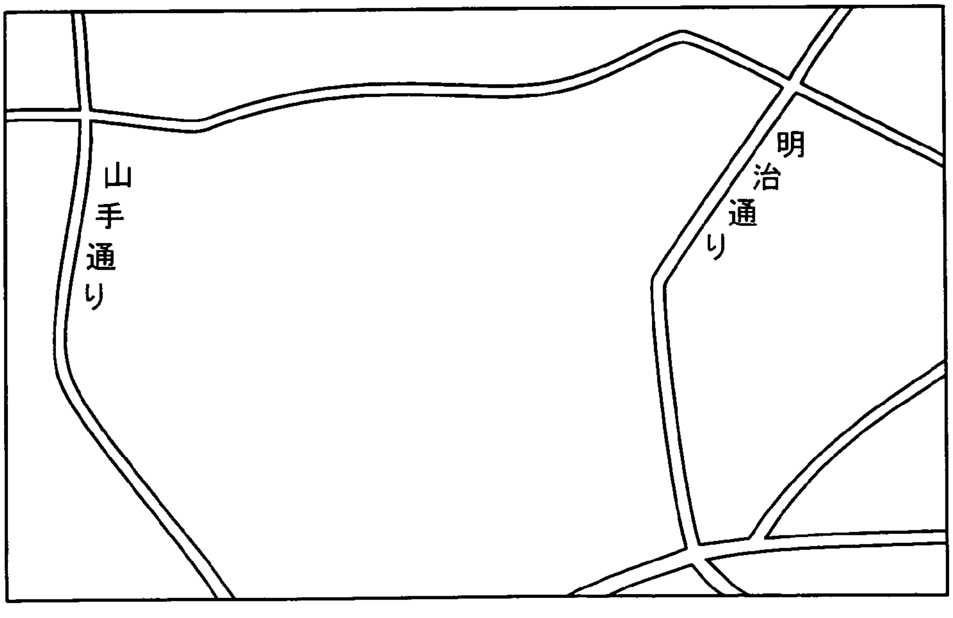
FIG. 16 is a drawing of another example in which road names are displayed by the map displaying apparatus shown in FIG. 1, using Chinese characters, which are not rotatable.

Next, an example in which the map displaying apparatus 20 shown in FIG. 1 displays a road name, using Chinese characters, which are not rotatable, will be explained. FIG. 15 is a drawing of an example in which a road name is displayed by the map displaying apparatus 20 shown in FIG. 1, using Chinese characters, which are not rotatable. FIG. 16 is a drawing of another example in which road names are displayed by the map displaying apparatus 20 shown in FIG. 1, using Chinese characters, which are not rotatable.

As shown in FIG. 15, because the inclination angle of the road 〝靖国通り〞 running through the center of the display screen is smaller than 60 degrees with respect to the horizontal direction of the display screen, the map-display-data generating unit 264 displays the road name from the left to the right of the display screen. On the other hand, as shown in FIG. 16, because the inclination angle of each of the roads 〝明治通り〞 and 〝山の手通り〞 running through the display screen on the right side and on the left side from the top to the bottom is equal to or larger than 60 degrees with respect to the horizontal direction of the display screen, the map-display-data generating unit 264 displays each of the road names from the top to the bottom of the display screen.

Figure 17:
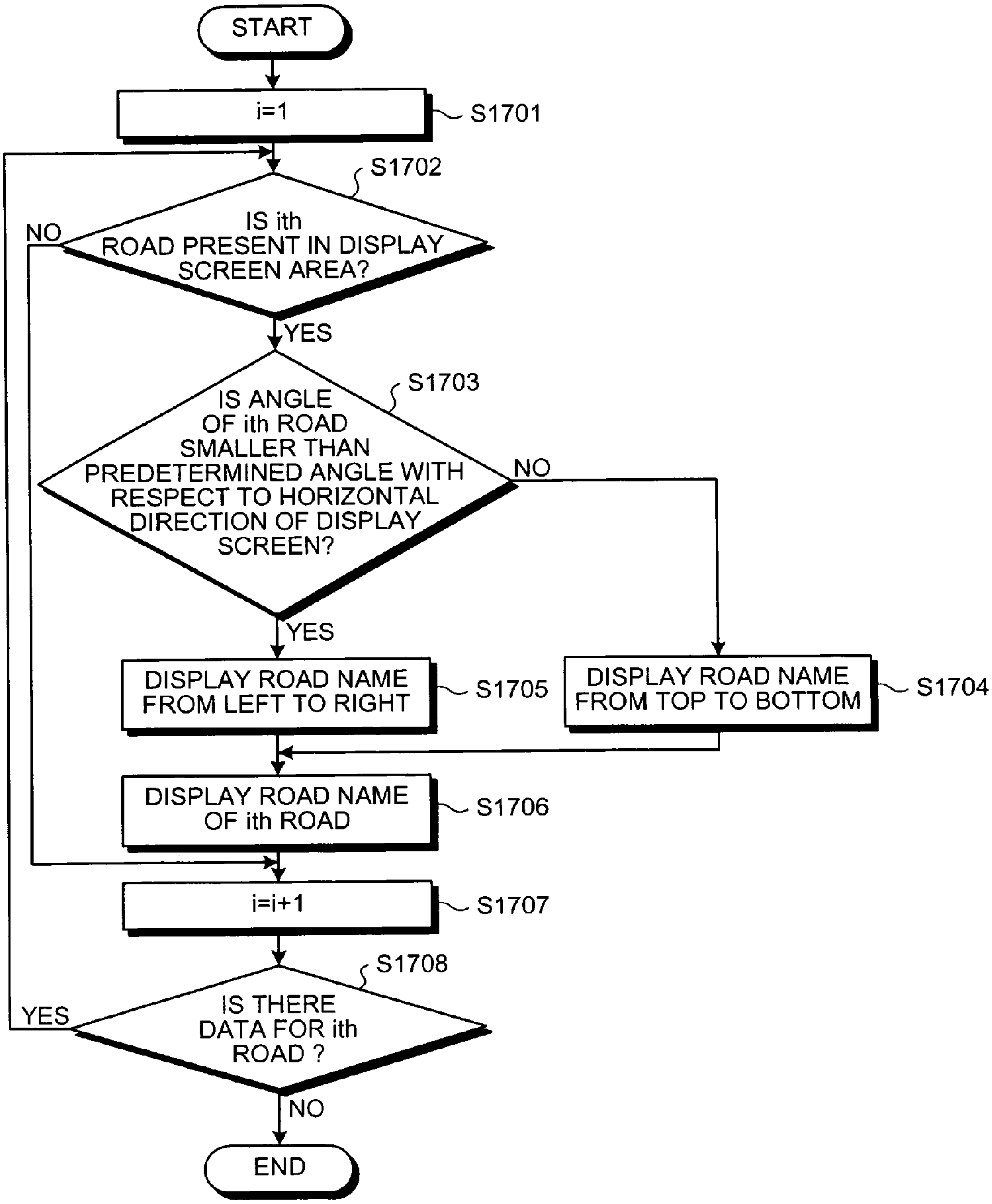
FIG. 17 is a flow chart of a road name displaying procedure to be performed by the map displaying apparatus shown in FIG. 1.

Next, the road name displaying procedure performed by the map displaying apparatus 20 shown in FIG. 1 will be explained. FIG. 17 is a flow chart of the road name displaying procedure performed by the map displaying apparatus 20 shown in FIG. 1. As shown in the drawing, in order to sequentially display the road names that are in correspondence with the pieces of identification information shown in the road-name table, the map-display-data generating unit 264 initializes the pointer i that indicates a corresponding one of the pieces of road identification information so that “i=1” is satisfied (step S1701).

Further, the road-display judging unit 263 checks to see if the ith road is present in a display screen area determined by the map-display-area determining unit 262 (step S1702). As a result, when the ith road is not present in the display screen area determined by the map-display-area determining unit 262 (step S1702: NO), the map-display-data generating unit 264 advances to step S1707.

On the contrary, when the ith road is present in the display screen area determined by the map-display-area determining unit 262 (step S1702: YES), the map-display-data generating unit 264 further checks to see if the inclination angle of the ith road with respect to the horizontal direction of the display screen is smaller than a predetermined angle (step S1703). As a result, when the inclination angle of the ith road with respect to the horizontal direction of the display screen is equal to or larger than a predetermined angle (step S1703: NO), the map-display-data generating unit 264 displays the road name from the top to the bottom (step S1704). For example, the predetermined angle may be 60 degrees.

On the contrary, when the inclination angle of the ith road with respect to the horizontal direction of the display screen is smaller than a predetermined angle (step S1703: YES), the map-display-data generating unit 264 displays the road name of the ith road from the left to the right (step S1705). The map-display-data generating unit 264 then writes the road name of the ith road into the display data memory 253 (step S1706). Further, the map-display-data generating unit 264 adds 1 to the pointer i (step S1707) and checks to see if the road-identification-information table includes data for the ith road (step S1708).

As a result, when the road-identification-information table does not include data for the ith road (step S1708: NO), the map-display-data generating unit 264 completes this procedure. On the contrary, when the road-identification-information table includes the data for the ith road (step S1708: YES), the map-display-data generating unit 264 returns to step S1702 and repeats the procedure from step S1702 through step S1707 until the road name of the last road is displayed.

As explained so far, according to the first modification example, the arrangement is made in which, when the display angle of each character or symbol included in a character symbol string indicated in name information is not rotatable, a direction in which the characters or symbols included in the character symbol string are to be sequentially displayed is determined, based on the inclination angle of the road with respect to a predetermined direction of the display screen, and map display data is generated for sequentially displaying the character symbol string in the determined order. It is therefore possible to change the direction in which the road name is displayed according to the inclination angle of the road. Thus, it is possible to display the pieces of name information of the traffic routes in such a manner that they are easy to see.

Further, the arrangement is made in which, when the display angle of each character or symbol included in a character symbol string indicated in name information is not rotatable, map display data is generated so that the characters or symbols included in the character symbol string are displayed from the left to the right if the inclination angle of the road with respect to the horizontal direction of the display screen is smaller than a predetermined angle, and the characters or symbols included in the character symbol string are displayed from the top to the bottom if the inclination angle of the road with respect to the horizontal direction of the display screen is equal to or larger than the predetermined angle. It is therefore possible to change the direction in which the road name is displayed according to the inclination angle of the road. Thus, it is possible to display the pieces of name information of the traffic routes in such a manner that they are easy to see.

Modification Example 2

According to the first and the second embodiments described above, the CPU in the control unit executes the processing including the displaying of the maps, according to a program stored in the memory unit such as the ROM; however, another arrangement is acceptable in which a program for having a computer execute the processing is provided for a user via a communication line such as the Internet. Also, another arrangement is acceptable in which such a program is provided for a user as being recorded on a computer-readable recording medium like a CD-ROM (Compact Disc—Read Only Memory). Further, another arrangement is acceptable in which the map displaying apparatus is configured to be realized with a hardware circuit exclusively used for performing the processing and is supplied for a user.

INDUSTRIAL APPLICABILITY

As explained so far, the map displaying apparatus, the map displaying method, and the map displaying program are useful in application to navigation apparatuses for mobiles or the like, and are particularly suitable for application to portable navigation apparatuses.

The invention claimed is:

1. A map displaying apparatus that obtains map data including curved-point coordinate information and name information of a traffic route for displaying the traffic route, which is transmitted from a map-data distributing server via a network, and displays a map based on the obtained map data on a display screen, the map displaying apparatus comprising:

- a display-area determining unit that determines a display area in which the map is to be displayed;
- an obtaining unit that obtains, from the map data transmitted from the map-data distributing server, the curved-point coordinate information and the name information of the traffic route to be displayed in the display area determined by the display-area determining unit; and
- a map-display-data generating unit that determines a display position of each character or symbol included in a character/symbol string in the name information so that the character or the symbol is positioned along the traffic route without interfering with another character or symbol, generates map display data for displaying the character or the symbol at the determined display position, and when the character or symbol is rotated and displayed, a judgment-purpose pixel range that is larger than a pixel range for displaying any single character or symbol is employed to judge whether the character or symbol interferes with another character or symbol as a result of the rotation.

2. The map displaying apparatus according to claim 1, wherein when a display angle of the character or the symbol is rotatable, the map-display-data generating unit determines the display angle of the character or the symbol so that the character or the symbol is positioned along the traffic route, and generates the map display data so that the character or the symbol is sequentially displayed from left to right on the display screen.

3. The map displaying apparatus according to claim 1, wherein when a display angle of the character or the symbol is not rotatable, the map-display-data generating unit determines a direction in which the character or the symbol is to be displayed sequentially on the display screen, based on an inclination angle of the traffic route with respect to a predetermined direction of the display screen, and generates the map display data for sequentially displaying the character/symbol string in the determined direction.

4. The map displaying apparatus according to claim 3, wherein when the display angle of the character or the symbol is not rotatable, the map-display-data generating unit generates the map display data for displaying the character or the symbol from left to right if the inclination angle of the traffic route with respect to a horizontal direction of the display screen is smaller than a predetermined angle, and for displaying the character or the symbol from top to bottom if the inclination angle is equal to or larger than the predetermined angle.

5. The map displaying apparatus according to claim 1, wherein upon judging whether the character or the symbol interferes with the other character or symbol, the map-display-data generating unit uses a judgment character pixel range that is larger than a pixel range for displaying a single character or a single symbol, and judges whether the pixel range of the other character interferes with the judgment character pixel range.

6. A map displaying apparatus that obtains map data including curved-point coordinate information and name information of a traffic route for displaying the traffic route individually, which is transmitted from a map-data distributing server via a network, and displays a map based on the obtained map data on a display screen, the map displaying apparatus comprising:

- a display-area determining unit that determines a display area in which the map is to be displayed;
- an obtaining unit that obtains, from the map data transmitted from the map-data distributing server, the curved-point coordinate information and the name information of the traffic route to be displayed in the display area determined by the display-area determining unit; and
- a map-display-data generating unit that generates map display data for displaying a character/symbol string in the name information along the traffic route, wherein before generating the map display data, the map-display-data generating unit judges whether the map display data for displaying the character/symbol string in the display area determined by the display-area determining unit is generated, and if the map display data is generated, the map-display-data generating unit does not generate the map display data, and when the character or symbol is rotated and displayed, a judgment-purpose pixel range that is larger than a pixel range for displaying any single character or symbol is employed to judge whether the character or symbol interferes with another character or symbol as a result of the rotation.

7. A method of obtaining map data including curved-point coordinate information and name information of a traffic route for displaying the traffic route individually, which is transmitted from a map-data distributing server via a network, and displaying a map based on the obtained map data on a display screen, the method comprising:

- determining a display area in which the map is to be displayed;
- obtaining, from the map data transmitted from the map-data distributing server, the curved-point coordinate information and the name information of the traffic route to be displayed in the display area determined at the determining; and
- generating including
  - determining a display position of each character or symbol included in a character/symbol string in the name information so that the character or the symbol is positioned along the traffic route without interfering with other character or symbol, and
  - generating map display data for displaying the character or the symbol at the determined display position, including judging, when the character or symbol is rotated and displayed, using a judgment-purpose pixel range that is larger than a pixel range for displaying any single character or symbol, whether the character or symbol interferes with another character or symbol as a result of the of rotation.

8. A method of obtaining map data including curved-point coordinate information and name information of a traffic route for displaying the traffic route individually, which is transmitted from a map-data distributing server via a network, and displaying a map based on the obtained map data on a display screen, comprising:

determining a display area in which the map is to be displayed;

obtaining, from the map data transmitted from the map-data distributing server, the curved-point coordinate information and the name information of the traffic route to be displayed in the display area determined at the determining; and generating map display data for displaying a character/symbol string in the name information along the traffic route, wherein before generating the map display data, the generating includes judging whether the map display data for displaying the character/symbol string in the display area determined at the determining is generated, and not generating the map display data if the map display data is generated, and judging, when the character or symbol is rotated and displayed, using a judgment-purpose pixel range that is larger than a pixel range for displaying any single character or symbol, whether the character or symbol interferes with another character or symbol as a result of the rotation.

9. A computer-readable recording medium including computer executable instructions for obtaining map data including curved-point coordinate information and name information of a traffic route for displaying the traffic route individually, which is transmitted from a map-data distributing server via a network, and displaying a map based on the obtained map data on a display screen, wherein instructions, when executed by a processor, cause the processor to perform a method comprising:

determining a display area in which the map is to be displayed;

obtaining, from the map data transmitted from the map-data distributing server, the curved-point coordinate information and the name information of the traffic route to be displayed in the display area determined at the determining; and generating including determining a display position of each character or symbol included in a character/symbol string in the name information so that the character or the symbol is positioned along the traffic route without interfering with other character or symbol; and generating map display data for displaying the character or the symbol at the determined display position, including judging, when the character or symbol is rotated and displayed, using a judgment-purpose pixel range that is larger than a pixel range for displaying any single character or symbol, whether the character or symbol interferes with another character or symbol as a result of the of rotation.

10. A computer-readable recording medium including computer executable instructions for obtaining map data including curved-point coordinate information and name information of a traffic route for displaying the traffic route individually, which is transmitted from a map-data distributing server via a network, and displaying a map based on the obtained map data on a display screen, wherein the instructions, when executed by a processor, cause the processor to perform a method comprising:

determining a display area in which the map is to be displayed;

obtaining, from the map data transmitted from the map-data distributing server, the curved-point coordinate information and the name information of the traffic route to be displayed in the display area determined at the determining; and generating map display data for displaying a character/symbol string in the name information along the traffic route, wherein before generating the map display data, the generating includes judging whether the map display data for displaying the character/symbol string in the display area determined at the determining is generated, and not generating the map display data if the map display data is generated, and judging, when the character or symbol is rotated and displayed, using a judgment-purpose pixel range that is larger than a pixel range for displaying any single character or symbol, whether the character or symbol interferes with another character or symbol as a result of the rotation.

* * * * *